United States Patent [19]

Leidinger

[11] Patent Number: 5,253,701
[45] Date of Patent: Oct. 19, 1993

[54] EVAPORATION HEAT EXCHANGER APPARATUS FOR REMOVING HEAT

[75] Inventor: Bernhard Leidinger, Weyhe-Leeste, Fed. Rep. of Germany

[73] Assignee: ERNO Raumfahrttechnik GmbH, Bremen, Fed. Rep. of Germany

[21] Appl. No.: 940,471

[22] Filed: Sep. 4, 1992

[30] Foreign Application Priority Data

Sep. 14, 1991 [DE] Fed. Rep. of Germany ....... 4130693

[51] Int. Cl.$^5$ ............................................. G05D 23/12
[52] U.S. Cl. ........................................ 165/39; 165/110
[58] Field of Search ................................. 165/39, 110

[56] References Cited

U.S. PATENT DOCUMENTS 2,867,990  1/1959  Cary .................................. 165/39 X
4,595,046  6/1986  Sisno ..................................... 165/39

FOREIGN PATENT DOCUMENTS 3718873  11/1988  Fed. Rep. of Germany .

Primary Examiner—John C. Fox
Attorney, Agent, or Firm—W. G. Fasse

[57] ABSTRACT

Heat generated, for example, in a spacecraft under zero gravity conditions and different accelerations is discharged through an evaporation heat exchanger connected to at least one active coolant circulation circuit. The heat exchanger has a bundle of tubes axially arranged inside a cylindrical processing chamber. An evaporant passes through these tubes. A coolant flows into heat exchange contact with outer surfaces of said tubes. The outlet cross-sectional flow area for the evaporant, or rather its vapor, is variable so that the pressure of the evaporated medium, and thereby also its evaporation temperature are adjustable. The adjustment of the cross-sectional flow area for the vapor is controlled in response to the temperature of the cooling liquid or coolant where it enters into a processing chamber of the heat exchanger. Selectively closable apertures in an end plate (52) serve for changing the outlet cross-section flow area for the vapor. The apertures are, at least partially, closable by flaps which are controlled by bimetal springs responsive to the temperature of the entering coolant.

6 Claims, 5 Drawing Sheets

EVAPORATION HEAT EXCHANGER APPARATUS FOR REMOVING HEAT

CROSS-REFERENCE TO RELATED APPLICATIONS

The present invention relates to U.S. Ser. No.: 07/940,470, filed On Sep. 4, 1992; by Bernhard Leidinger, entitled: "EVAPORATION HEAT EXCHANGER APPARATUS FOR REMOVING HEAT"; and to U.S. Ser. No. 07/940,505, filed on Sep. 4, 1992; by Bernhard Leidinger, entitled: "METHOD AND APPARATUS FOR REMOVING HEAT GENERATED IN A SPACECRAFT".

FIELD OF THE INVENTION

The invention relates to an evaporation heat exchanger for removing heat generated in a spacecraft under zero gravity conditions and under different accelerations.

BACKGROUND INFORMATION

In spacecraft that are in the take-off or landing phase through the earth's atmosphere, or spacecraft exposed to extreme thermal stress in orbit around the earth, it is necessary that the generated heat is safely and reliably removed. Evaporation heat exchangers are employed for this purpose.

The basic principle of operation of such heat exchangers lies in that, the medium to be cooled, referred to herein as coolant, circulates in an active liquid circulating circuit for the heat removal, by bringing the coolant into heat transferring contact with a medium to be evaporated, which is stored in a supply container. The evaporated medium in the form of vapor is then discharged out of the spacecraft into the surroundings.

In order to optimally use the medium to be evaporated referred to herein as "evaporant", the evaporation must be as complete as possible, whereby it is important to ensure as good a thermal contact as possible for the heat transfer between the cooling liquid and the evaporant to transform the latter into vapor to be discharged.

In a conventional heat exchanger described, for example, in German Patent Publication DE-PS 3,718,873, (Muschelknautz et al., published on Nov. 10, 1988), the cooling liquid, or rather coolant, flows through individual channels extending through a processing or heat exchange space, into which the medium to be evaporated is sprayed in droplet form through an inlet valve. In a second conventional evaporation heat exchanger, the cooling liquid or coolant flows openly through the processing space, while the medium to be evaporated is caused to flow through individual channels usually arranged in bundles passing through the heat exchange space. The cooling liquid is, in addition, forced into a meandering flow path through screens arranged in the processing space or chamber.

The danger of icing or ice formation exists in such an evaporation heat exchanger, if it is operated with water as the cooling liquid. In order to prevent this danger, it may be necessary, under certain circumstances, to influence the evaporation temperature of the evaporant, which is often ammonia.

OBJECTS OF THE INVENTION

In view of the above it is the aim of the invention to achieve the following objects singly or in combination:

to develop an evaporation heat exchanger of the type mentioned above, so that it makes possible a simple and also reliably functioning control of the evaporation temperature of the evaporant;

to make sure that the temperature of the evaporant is so controlled that substantially only fully vaporized evaporant is discharged in the form of vapor and not in the form of evaporant droplets; and to avoid or at least minimize the danger of icing in the processing chamber.

SUMMARY OF THE INVENTION

The invention achieves these objects in a heat exchanger having the following characteristics.

A plurality of tubes through which the evaporant flows, is arranged in a processing chamber. The tubes are spaced from each other and gathered into a bundle. The coolant is caused to flow into heat exchange contact with the outer surfaces of the tubes and the flow direction of the coolant is influenced by baffle members in the processing chamber. Flow control members, for example covers or flaps, are provided for varying the flow cross-sectional area of the evaporant outlet in response to the entrance temperature of the coolant.

According to the invention, the pressure of the evaporated medium, namely of the vapor is influenced through a variation of the vapor outlet cross-section, whereby evaporation temperature is also influenced, so that the danger of icing is reliably prevented. Such a control is achieved in an especially simple manner, in that the vapor flow is divided into several partial flows or streams, which are each guided over separate exhaust screens or baffles. The evaporation pressure can be influenced in a simple manner, by an actively controlled opening and closing of individual screens or baffles.

In a further embodiment of the invention, the opening or closing of individual baffles can be achieved by a closed loop control unit response to the entrance temperature of the coolant. In the simplest embodiment a bimetal spring responsive to the coolant entrance temperature forms the closed loop control unit. This simple embodiment is especially possible, if the vapor flow is divided into a base stream, the control baffle of which is substantially always open, and into at least three additional vapor streams, each having separately controllable baffles. Even if, during a break-down in such an arrangement, one of the additional baffles should remain closed, the evaporation temperature rises only slightly above the desired value and vice versa. In both cases the unit remains fully operational.

BRIEF DESCRIPTION OF THE DRAWINGS

The invention will now be described in more detail, by way of example, with reference to the following drawings, wherein.

DETAILED DESCRIPTION OF PREFERRED EXAMPLE EMBODIMENTS AND OF THE BEST MODE OF THE INVENTION

In the figures the same components or elements have the same reference numbers.

Figure 1:
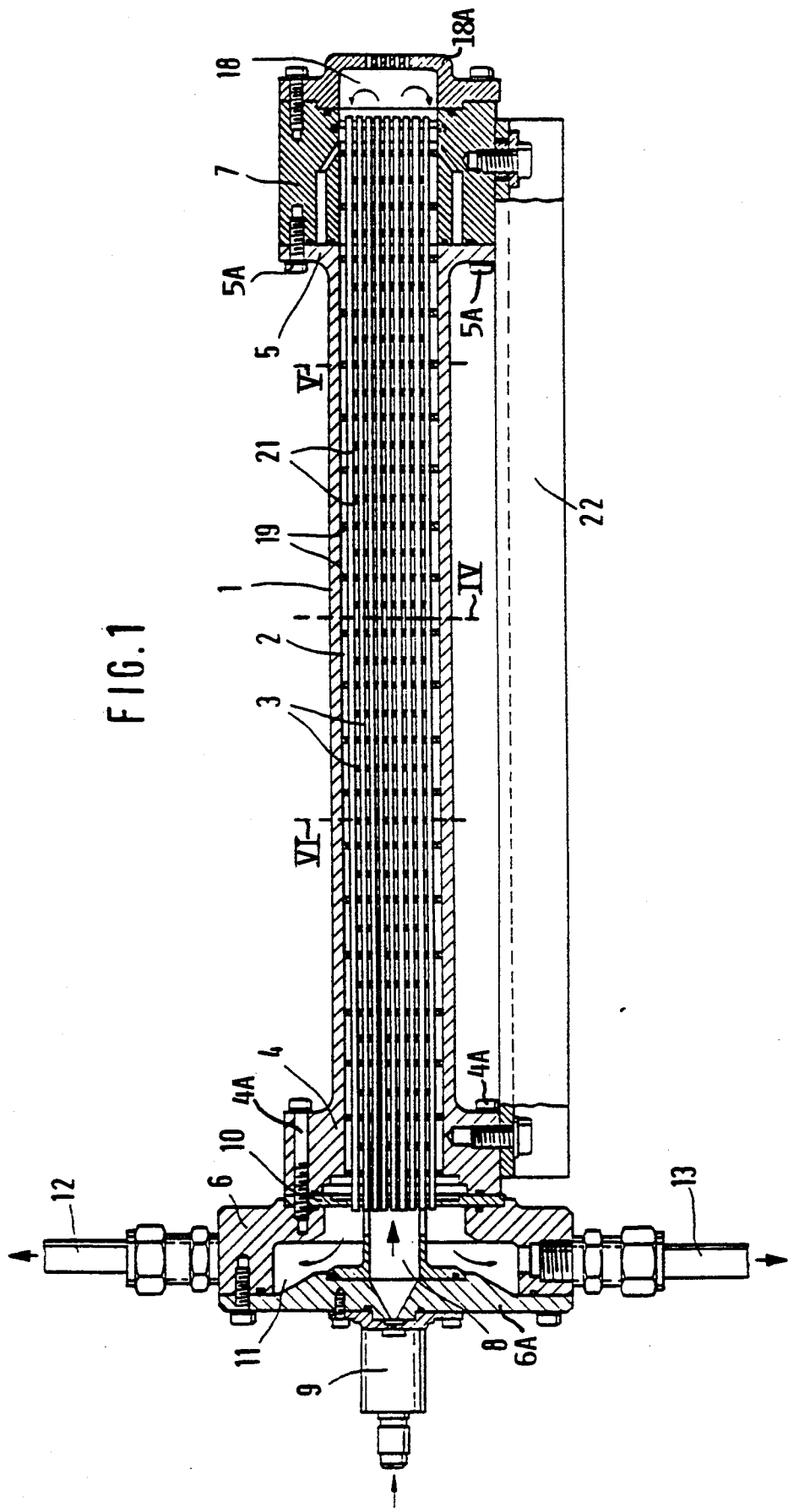
FIG. 1 is a longitudinal section through a first embodiment of an evaporation heat exchanger of the invention
Figure 4:
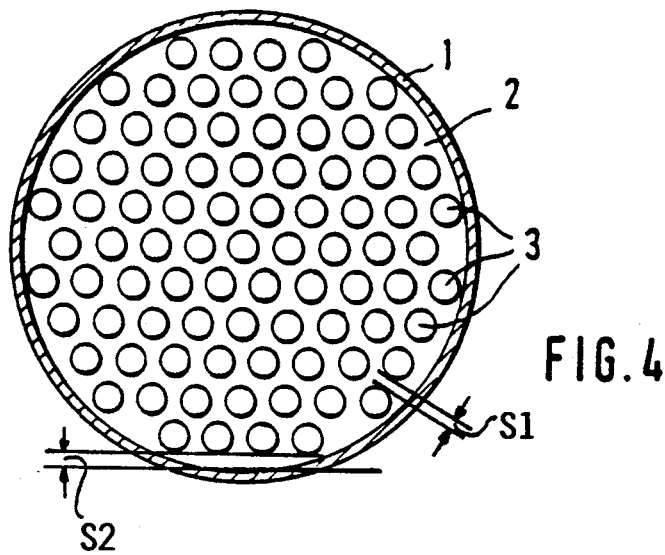
FIGS. 4,5,6 are vertical sections through various regions of the unit shown in FIG. 1 along respective section planes IV, V, and VI.

FIG. 1 shows an evaporation heat exchanger which comprises a cylindrical housing 1, in which a bundle of similar tubes 3 are arranged in a processing chamber 2. The tubes 3 run parallel to the longitudinal axis of the housing 1 and are distributed equally and uniformly across the entire cross-sectional area of the processing chamber 2, as shown especially in the cross-section of FIG. 4. The spacing S1 between individual tubes 3 is chosen to be at least as large as the spacing S2 between the edge of a tube bundle and the inner wall surface of the housing 1. The housing 1 has on each of its ends a connecting flange 4 and 5 respectively. The left end flange 4 connects the housing 1 with an end body 6 by screws 4A. The right flange 5 connects the housing 1 to an end body 7 by screws 5A. The construction of the end bodies 6 and 7 will be further described below. The spacings S1 and S2 are shown in FIG. 4.

The left end body 6 of FIG. 1 has a central inlet chamber 8 for the evaporant, e.g. ammonia ($NH_3$). The chamber 8 tapers conically in the direction of an inlet valve 9. The radius of the inlet chamber 8 that is open toward the processing chamber 2 is so dimensioned that it encompasses an inner group of tubes 3 wherein the number of tubes is about 50% of the total number of tubes 3 in the chamber 2 of housing 1. These tubes reach or penetrate through an apertured plate 10, which forms the actual end of the processing chamber 2, so that open tube ends are in the inlet chamber 8. The other half of the tube bundle which forms the outer ring of the tube bundle, also penetrates through the apertured plate 10 into an outlet ring chamber 11 which encircles the inlet chamber 8, and which is provided with a total of four outlet openings 12 to 15, arranged at 90° spacing from one another for discharging the vapor into which the evaporant has been transformed by cooling the coolant.

Figure 2:
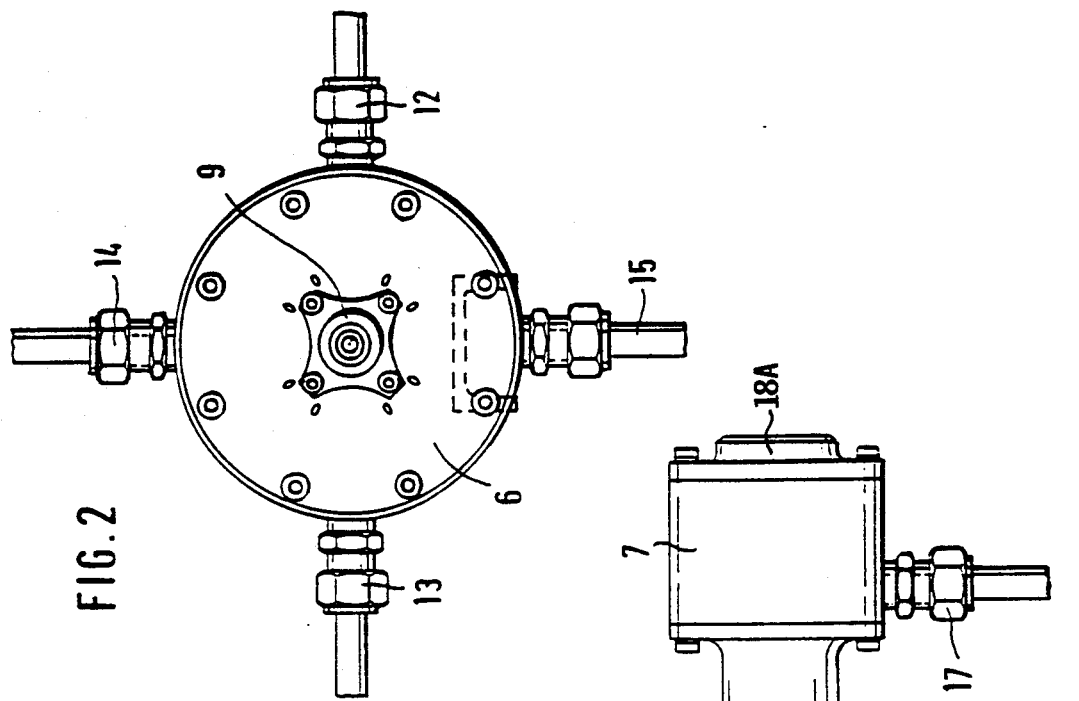
FIG. 2 is a side view of the exchanger of FIG. 1.
Figure 3:
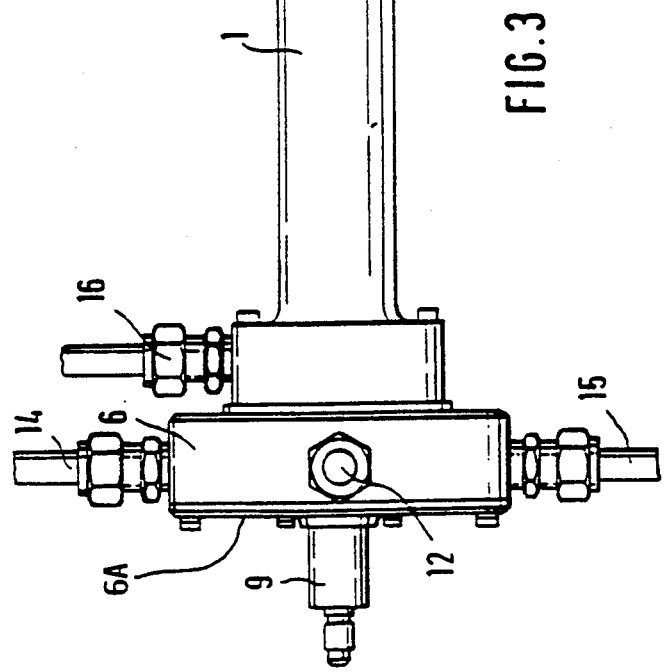
FIG. 3 is a top plan view of the exchanger of FIG. 1.

Two of these outlet openings 12 to 15 which are not shown in FIG. 1, can be seen in FIG. 3, all outlets are seen in FIG. 2. FIG. 3 shows the housing 1 rotated by 90° relative to the illustration of FIG. 1. A further outlet 16 and a further inlet 17 can be seen in FIG. 3, both of which are provided for the coolant, in this case water, which is supplied directly into the processing chamber 2 in the housing 1. While the outlet 16 is arranged in a region of an enlarged diameter of the housing 1, the inlet 17 is located on a cylindrical partial section of the end body 7 shown on the right in FIG. 3. The body 6 is closed by a cover 6A.

The outlet openings 12 to 15 can each be closed by screens or baffle plates 52 with apertures which are described in more detail below with reference to FIGS. 9 and 10.

The tubes 3 which contain the evaporant are guided through the aforementioned end body 7, as seen from FIG. 1, to a collecting chamber 18 closing the interior of the end body 7. The chamber 18 is formed in a cover 18A and provides communication between the group of centrally located tubes 3, which are connected with the inlet chamber 8, and the group of outer tubes 3 which lead into the outlet ring chamber 11 in the body 6.

Figure 5:
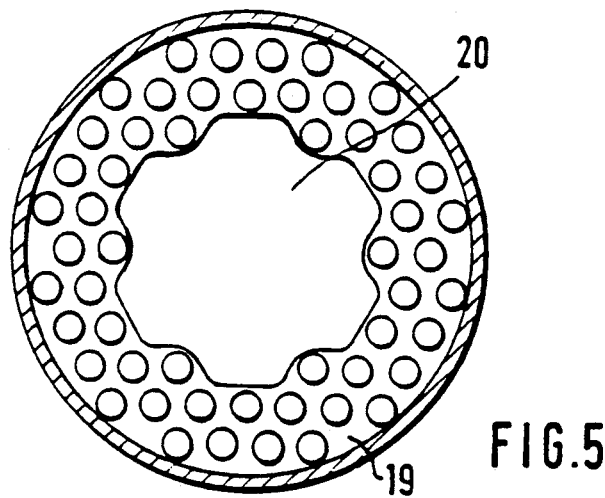
Figure 6:
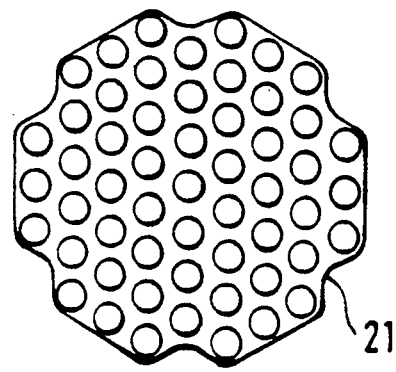

There are two different types of guidance screens or baffles arranged alternately inside the processing chamber 2. Apertured baffles 19 are one type of guidance screens as depicted in FIG. 5. The baffles 19 have an opening 20 in the central portion of the processing chamber 2. The other type of guidance screen is an annular baffle 21 which leaves an opening in the form of an annular clearance radially outwardly in the processing chamber 2. The entire arrangement is mounted on a carrier 22 shown in FIG. 1.

The operation of the above described arrangement will now be described by way of a second example embodiment of the invention, that is depicted in a rather simplified principle sketch in FIG. 7. To keep FIG. 7 simple and to show an overview, the individual tubes 33 for the evaporant in the processing chamber 32 are not shown in FIG. 7. As can be seen in FIG. 8, showing a cross-section through the heat exchanger of FIG. 7, the tubes 33 which are arranged in the processing chamber 32 inside a housing 31, are grouped in a total of three groups. A central group 34 comprises about twenty to thirty tubes arranged in the center of the bundle. A middle group 35 with about the same number of tubes surrounds the central group. A radially outer or edge group 36 comprises about thirty to forty tubes.

At both ends of the processing chamber 32, these groups 34, 35, 36 of tubes 33 are communicating with one another through collecting chambers 37, 38. The groups 34 and 35 are interconnected by the central collecting chamber 37 and the groups 35 and 36 are interconnected on the inlet side of the evaporant by the ring-shaped collecting chamber 38 that encircles the inlet opening 39 for the evaporant. The evaporated evaporant or vapor is then collected to an outlet chamber 40 for discharge into the surroundings through an exit port or opening 40A.

Figure 7:
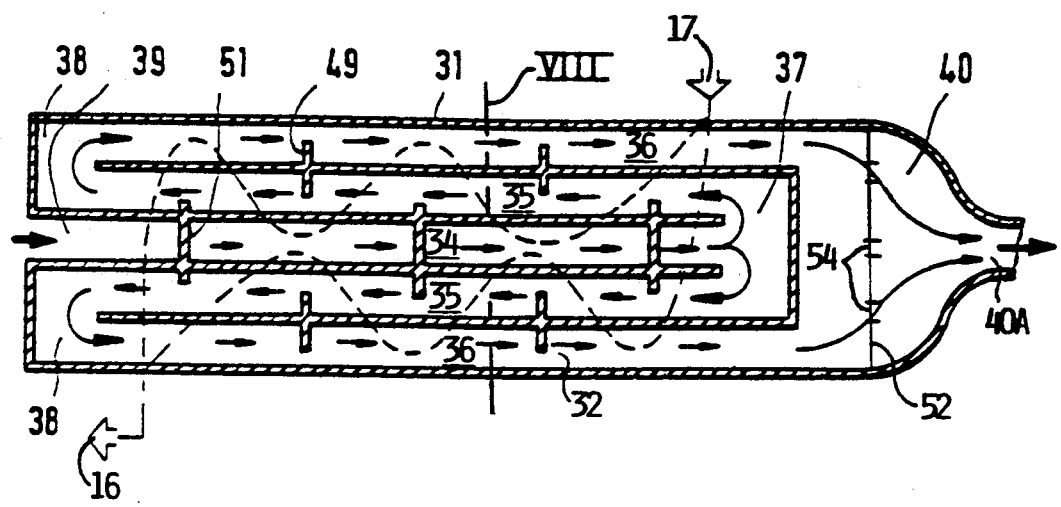
FIG. 7 is a principle sketch of a second embodiment of an evaporation heat exchanger of the invention.
Figure 8:
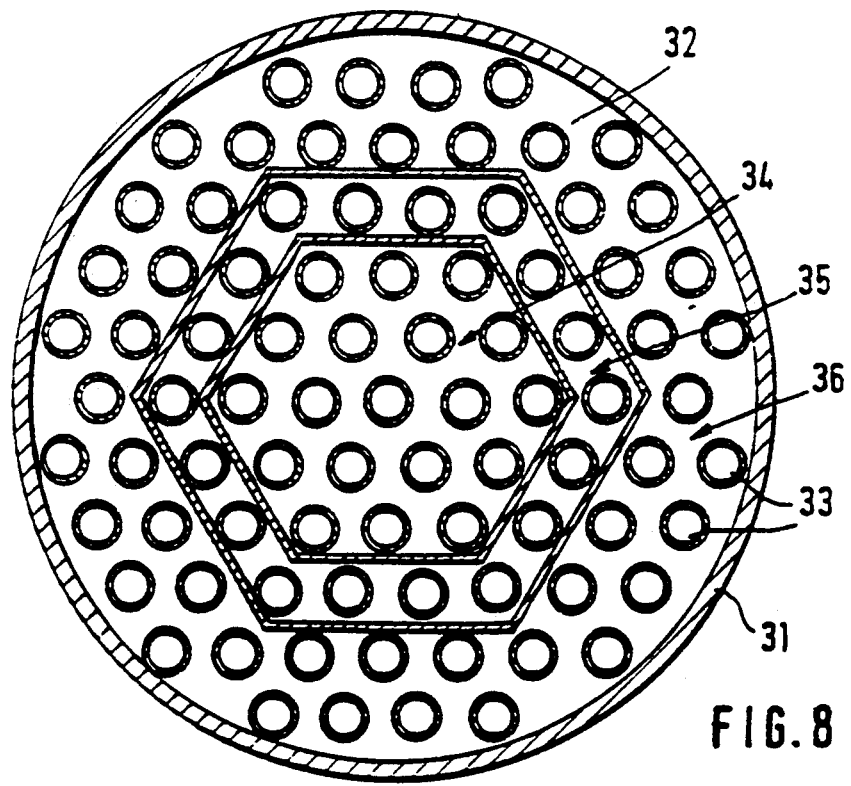
FIG. 8 is a cross-section through a heat exchanger according to FIG. 7 along section plane VIII.
Figure 9:
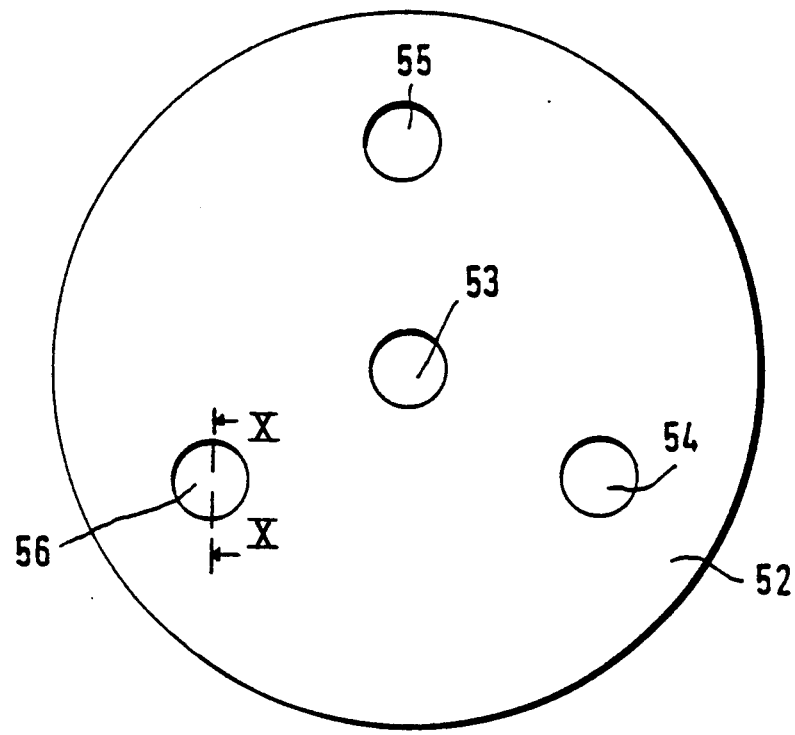
FIG. 9 is a plan view of a baffle plate arranged in the outlet region of the heat exchanger shown in FIG. 7.
Figure 10:
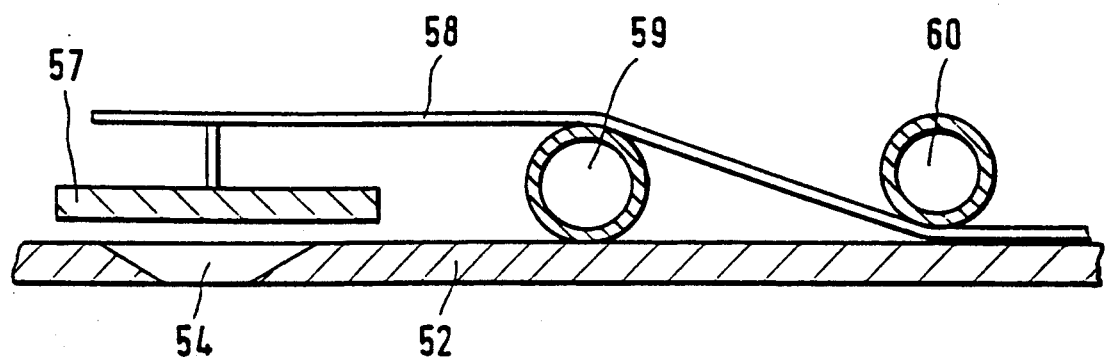
FIG. 10 is a cross-section along section plane X—X through a partial region of the baffle plate shown in FIG. 9.

According to the invention, the flow of the vapor collected in an outlet chamber 40, is controlled by temperature responsive elements shown in FIGS. 7, 9, and 10. For this purpose, the outlet chamber 40 is closed off by a plate 52, shown in FIG. 9, in which there are several apertures 53 to 56. The centrally located aperture 53 cannot be varied in its cross-sectional flow area while the apertures 54 to 56 can each be closed more or less by a temperature responsive mechanism, as shown in FIG. 10.

This mechanism comprises a flap or cover 57 which is held on a bimetal spring 58, which in turn is inserted between two tubes or pipes 59 and 60, whereby the bimetal spring 58 functions as a temperature sensor. These pipes are connected to a loop through which a portion of the coolant entering into the processing chamber 2 flows. The temperature of the coolant in the tubes 59 and 60 is sensed by the bimetal of the spring 58 which then acts in response to the sensed temperature to more or less open or close the flap or cover 57.

In this second embodiment of the present evaporation heat exchanger, different types of guidance screens or flow control baffles 49 and 51 are arranged in alternating fashion. The in- and outlet openings 17 and 16 respectively for the coolant flowing through the processing chamber 32 are merely shown symbolically in FIG. 7. The direction of movement of the coolant, in this case also water, and of the evaporant, e.g. ammonia, are shown by arrows for the evaporant and by dashed lines from the inlet 17 to the outlet 16 for the coolant.

The coolant enters at 17 the right portion of the processing chamber 32, as seen in FIG. 7, with an entrance temperature, in this example, between about 24° and 67° C. The coolant then flows between the tubes 33 containing the evaporant, whereby the largest portion of the heat contained in the coolant is transferred to the evaporant, whereby the latter is converted into steam, before coolant leaves the processing chamber 32 at 16 with a temperature of about 5° or 6° C. for renewed use in the cooling system of the spacecraft. The alternating guidance screens or baffles 49, 51 in the processing chamber create a meandering dashed-line flow path for the coolant, as seen in FIG. 7, which constantly leads to a renewed mixing and thereby to a very homogenous temperature distribution in the streams or flows of coolant flowing through the spaces S1 between the tubes.

On the other hand, the evaporant is injected or fed into the central group 34 of tubes with an entrance temperature of about $-10°$ C. During its flow through the tubes, the evaporant is heated to an evaporation temperature and eventually begins to evaporate. At the discharge end of the tubes of the central group 34, the evaporant flows into the collecting chamber 37 for all the central tubes where the evaporant is diverted and guided into the tubes of the middle group 35. Due to the diversion by 180° an intensive mixing of the vapor and evaporant is achieved with uniform flow conditions.

The same flow conditions exist in all central tubes. The ammonia now flows in the same direction as the water to be cooled from the ammonia-exhaust side or chamber 37 to the ammonia-injection side 39, whereby the evaporant evaporates almost completely. Since the end of the tubes forming the intermediate group 35 of tubes lies at the water or coolant exit 16 of chamber 32 of the heat exchanger, the vapor and evaporant mixture is heated maximally to the exit temperature (6° C.) of the water. The vapor now flows into the second collecting chamber 38, where again almost homogenous flow conditions are maintained through another 180° U-turn for the next flow leg of the ammonia through the radially outer group 36 of tubes 33.

Then the ammonia vapor that may still include a few remaining droplets flows in the tubes of the outer group 36 in a direction opposite to the water flow direction toward the water entrance 17 side and to the ammonia exit 40A of the heat exchanger. Hereby, the vapor is heated to a remaining temperature difference of about 5° to 10° C. to the water's entrance temperature, which lies between 24° and 67° C. depending on the load, and then exits completely evaporated at 40A through the vapor flow control elements shown in FIGS. 7, 9, and 10.

These vapor flow control elements comprise the plate 52 with one or more of the apertures 54 to 56 that can be closed more or less as described above, whereby the evaporation pressure can be adjusted so that an icing danger for the coolant is prevented. The variation of the partition openings or rather their flow cross-sectional area depends on the entrance temperature of the coolant so that an optimal operating condition is always maintained.

Although the invention has been described with reference to specific example embodiments it will be appreciated that it is intended to cover all modifications and equivalents within the scope of the appended claims.

What I claim is:

1. An evaporation heat exchanger for removing heat generated in a spacecraft under zero gravity operating conditions and under accelerations, comprising a processing chamber (2, 32), a plurality of tubes arranged in a bundle, first inlet means for introducing an evaporant into said tubes, first outlet means for discharging vapor from said tubes, second inlet means for flowing a coolant to be cooled into heat exchange contact with outer surfaces of said tubes, second outlet means for returning cooled coolant into an active cooling circuit, baffle means for influencing a flow direction of said coolant in said processing chamber, temperature sensing means arranged for sensing the temperature of said coolant approximately where it enters said processing chamber (2, 32) through said second inlet means to provide a coolant temperature responsive control, and means for controlling a cross-sectional flow area of said first outlet means for discharging vapor in response to said temperature responsive control.

2. The evaporation heat exchanger of claim 1, wherein said first outlet means for discharging vapor comprise flow control members (53 to 56) arranged at end regions of said tubes (3, 33), said flow control members (53 to 56) being closable at least partially in response to temperature changes in the temperature of said coolant.

3. The evaporation heat exchanger of claim 2, wherein said flow control members of said first outlet means comprise a plate (52) with apertures (53 to 56) in said plate (52) arranged in an outlet region (40) for said vapor in said processing chamber, and closures (57) for selectively closing said apertures in response to said temperature responsive control.

4. The evaporation heat exchanger of claim 3, wherein at least some of said closures comprise flaps (57) for closing respective apertures (53 to 56) in said plate (52) arranged in an outlet region (40) in said processing chamber.

5. The evaporation heat exchanger of claim 4, wherein said temperature sensing flaps comprise bimetal springs (58) for closing and opening said flaps (57).

6. The evaporation heat exchanger of claim 5, further comprising heat conductor pipes (59, 60) connected to receive coolant entering said processing chamber, said bimetal springs (58) being arranged in thermal contact with said heat conductor pipes (59, 60) through which coolant entering into said processing chamber (2, 32) is flowing.

* * * * *